US012773968B2

(12) United States Patent
(10) Patent No.: US 12,773,968 B2
(45) Date of Patent: Oct. 27, 2026

Bhanushali et al.

(54) PARKING SAFETY PREDICTION SYSTEM FOR VEHICLES

(71) Applicant: Valeo Schalter und Sensoren GmbH, Bietigheim-Bissingen (DE)

(72) Inventors: Jagdish Bhanushali, Troy, MI (US); Thomas Heitzmann, Troy, MI (US)

(73) Assignee: Valeo Schalter und Sensoren GmbH (DE)

( * ) Notice: Subject to any disclaimer, the term of this patent is extended or adjusted under 35 U.S.C. 154(b) by 164 days.

(21) Appl. No.: 18/777,745

(22) Filed: Jul. 19, 2024

(65) Prior Publication Data

US 2026/0021789 A1 Jan. 22, 2026

(51) Int. Cl.

*B60R 25/30* (2013.01)
*G06V 10/764* (2022.01)
*G06V 20/58* (2022.01)
*H04N 23/61* (2023.01)

(52) U.S. Cl.

CPC .......... *B60R 25/305* (2013.01); *G06V 10/764* (2022.01); *G06V 20/58* (2022.01); *H04N 23/61* (2023.01)

(58) Field of Classification Search

CPC .... B60R 25/305; G06V 10/764; G06V 20/58; H04N 23/61

See application file for complete search history.

(56) References Cited

U.S. PATENT DOCUMENTS 10,322,696 B2 6/2019 Gao et al.
11,151,387 B2 * 10/2021 Nagata .................. G06V 20/48
11,361,552 B2 6/2022 Kale et al.
11,650,309 B2 * 5/2023 Velusamy ............ H04W 4/021 340/539.11
2018/0201227 A1 * 7/2018 Gao ...................... B60R 25/305
2019/0080313 A1 * 3/2019 Van Wiemeersch ........................ B60R 25/305
2024/0217479 A1 * 7/2024 Russo ................ B60R 25/1001

FOREIGN PATENT DOCUMENTS

GB 2592667 A 9/2021

* cited by examiner

*Primary Examiner* — Frederick M Brushaber
(74) *Attorney, Agent, or Firm* — Dickinson Wright PLLC

(57) ABSTRACT

Methods and systems for assisting a vehicle in predicting the safety of an environment about a vehicle. Image data is sensed by a vehicle image sensor regarding the environment about the vehicle. The system detects one or more first objects surrounding the vehicle based on the images received from the image sensors. An object classification model is performed on the images to determine a class of the one or more first objects. Utilizing deep machine learning on the class of one or more first objects, a safety score of the environment is predicted. While the vehicle is parked, the image sensor is triggered to record images in response to (1) one or more second objects being detected in the images and (2) the safety score being below a threshold.

20 Claims, 5 Drawing Sheets

PARKING SAFETY PREDICTION SYSTEM FOR VEHICLES

TECHNICAL FIELD

The present disclosure relates to methods and systems for utilizing image processing and machine learning to determine the safety of the environment about a vehicle, establishing a safety score of the environment, and recording images of the environment based on the determined safety score.

BACKGROUND

To enhance safety and security, vehicles can be equipped with a feature that records images of their surroundings. This feature uses external cameras and sensors to monitor the environment when the vehicle is parked, saving the captured images to a USB drive for later viewing. However, the cameras often start recording when people simply walk by, even if there is no threat. These false alarms lead to unnecessary vehicle power consumption.

SUMMARY

According to one embodiment, a system for assisting a vehicle in determining the safety of an environment about the vehicle is provided. The system includes a plurality of image sensors mounted to the vehicle, configured to capture images of the environment about the vehicle. The system also includes a processor coupled to the images sensors, and programmed to: receive the images; execute an object classification model on the images to determine a class of one or more first objects detected in the images; predict a safety score based on the class of the one or more first objects detected in the images, wherein the predicted safety score is associated with the safety of the environment about the vehicle; and while the vehicle is parked, record the images of the environment about the vehicle in response to (a) one or more second objects being detected in the images and (b) the safety score being below a threshold.

In another embodiment, a method for assisting a vehicle in determining the safety of an environment about the vehicle is provided. The method includes: receiving images captured by a plurality of image sensors mounted on the vehicle; executing an object classification model on the images to determine a class of one or more first objects detected in the images; predicting a safety score based on the class of the one or more first objects detected in the images, wherein the predicted safety score is associated with the safety of the environment about the vehicle; and recording the images of the environment about the vehicle while the vehicle is parked, wherein the recording is initiated in response to (a) one or more second objects being detected in the images and (b) the safety score being below a threshold.

In another embodiment, a non-transitory computer-readable storage medium storing instructions is provided which, when executed by one or more processors, cause the one or more processors to perform the following: receiving images captured by a plurality of image sensors mounted on a vehicle; executing an object classification model on the images to determine a class of one or more first objects detected in the images; predicting a safety score based on the class of the one or more first objects detected in the images, wherein the predicted safety score is associated with the safety of an environment about the vehicle; and recording the images of the environment about the vehicle while the vehicle is parked and in response to (a) one or more second objects being detected in the images and (b) the safety score being below a threshold.

DETAILED DESCRIPTION

Figure 1:
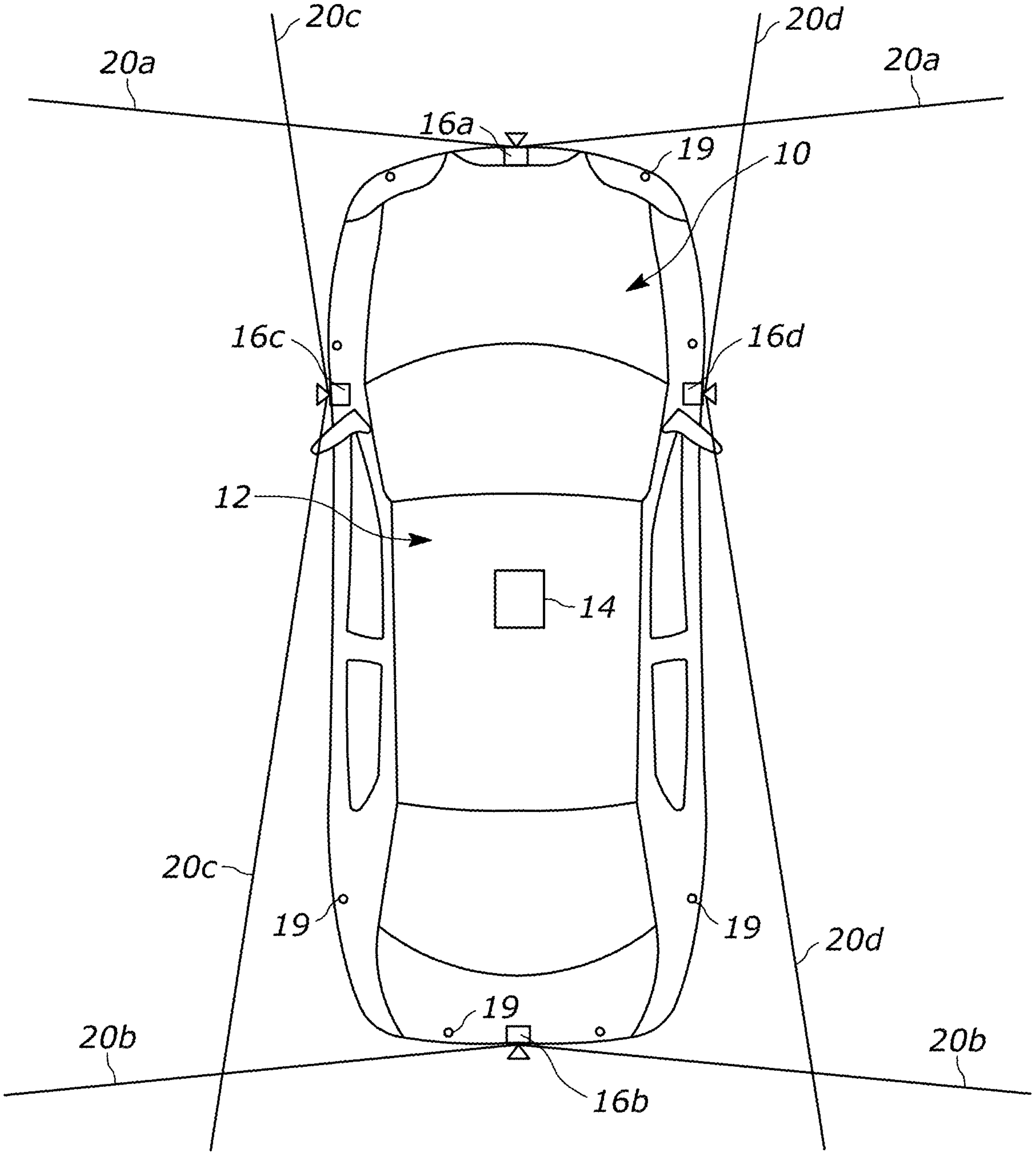
FIG. 1 illustrates a schematic of a vehicle according to an embodiment, shown from a top view.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Automotive vehicles can be equipped with a system that records images of their surroundings while parked. This system is designed to enhance the safety and security of a vehicle by using external cameras and sensors for monitoring the environment while the vehicle is parked. This feature then stores the captured images for later viewing. If a minimal threat is detected (e.g., someone leaning on the car), the system triggers the cameras to record, and the vehicle's display shows a message indicating that the car is recording images. If a more severe threat is detected (e.g., a window is broken), the system activates the vehicle's alarm, triggers cameras to record, increases the brightness of the display, and plays music at maximum volume to draw attention to the vehicle. However, the cameras often start recording when people simply walk by, even if there is no threat. These false alarms lead to unnecessary vehicle power consumption.

However, prior art systems, such as these, do not assess the risk of the environment around a parked vehicle. Thus, these systems can command excessive vehicle power consumption, due to the cameras actively recording unnecessarily.

Therefore, according to various embodiments disclosed herein, systems and methods for assisting a vehicle in determining a safety of an environment are provided. These systems and methods can capture images of the environment surrounding the vehicle, both while the vehicle is driving and once it is parked. The system can perform object classification, (e.g., via a deep machine learning model) on the images and predict the safety of the environment based on the content detected in the images Object classification is a type of machine learning model that categorizes objects within an image into predefined classes or categories. Examples of machine learning model(s) used for object classification are further described herein. Based on the predicted safety, the system can adjust the sensitivity of the threshold, e.g., the frequency in which the images are recorded. For example, in a safe area, a higher amount of activity in the environment outside the vehicle will be needed to trigger the camera recording. Likewise, in an unsafe area, the system may be more sensitive to activate the image recording.

FIG. 1 illustrates a schematic of a vehicle 10 according to an embodiment, shown here from a top view. The vehicle 10 is a passenger car, but can be other types of vehicles such as a truck, van, or sports utility vehicle (SUV), or the like. The vehicle 10 includes a camera system 12 which includes an electronic control unit (ECU) 14 connected to a plurality of cameras 16*a*, 16*b*, 16*c*, and 16*d*. In general, the ECU 14 includes one or more processors programmed to process the images data associated with the cameras 16*a-d*. In addition, as will be described further below, the vehicle 10 includes a plurality of proximity sensors (e.g., ultrasonic sensors, radar, sonar, LiDAR, etc.) 19. The proximity sensors 19 can be connected to their own designated ECU that develops a sensor map of objects external to the vehicle. Alternatively, the proximity sensors can be connected to the ECU 14. As further described later herein, the cameras 16*a-d* and proximity sensors 19 can be referred to as, types of image sensors.

The ECUs disclosed herein may more generally be referred to as a controller or processor. In the case of an ECU of a camera system 12, the ECU can be capable of receiving image data from the various cameras (or their respective processors), processing the information, and outputting instructions to identify and record the surroundings about a vehicle, for example. In the case of an ECU associated with the proximity sensors 19, the ECU can be capable of receiving sensor data from the various proximity sensors (or their respective processors), processing the information, and outputting a sensor map of objects surrounding the vehicle. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured to, upon execution by the processor, cause the object classification technique and algorithms described herein.

In the embodiment illustrated in FIG. 1, the cameras 16-*d* are located about different quadrants of the vehicle, although more than four cameras may be provided in the camera system 12. Each camera 16*a-d* may have a fish-eye lens to obtain images with an enlarged field of view, indicated by boundary lines 20*a-d*. In an example, a first camera 16*a* faces an area in front of the vehicle, and captures images with a field of view indicated by boundary lines 20*a*. The first camera 16*a* can therefore be referred to as the front camera. A second camera 16*b* faces an area behind the vehicle, and captures images with a field of view indicated by boundary lines 20*b*. The second camera 16*b* can therefore be referred to as the rear camera. A third camera 16*c* faces an area on the left side of the vehicle, and captures images with a field of view indicated by boundary lines 20*c*. The third camera 16*c* can therefore be referred to as the left camera, or left-side camera. The third camera 16*c* can also be mounted on or near the vehicle's left wing mirror, and can therefore be referred to as a mirror left (ML) camera. A fourth camera 16*d* faces an area on the right side of the vehicle, and captures images with a field of view indicated by boundary lines 20*d*. The fourth camera 16*d* can therefore be referred to as the right camera, or right-side camera. The fourth camera 16*d* can also be mounted on or near the vehicle's right wing mirror, and can therefore be referred to as a mirror right (MR) camera. As will be described further below, the ECU 14 can be configured to activate the cameras, record and store images, and do so based upon the surrounding environment. The processor(s) and associated memory in the ECU can also be programmed to perform the object recognition and other machine learning models described herein.

Figure 2:
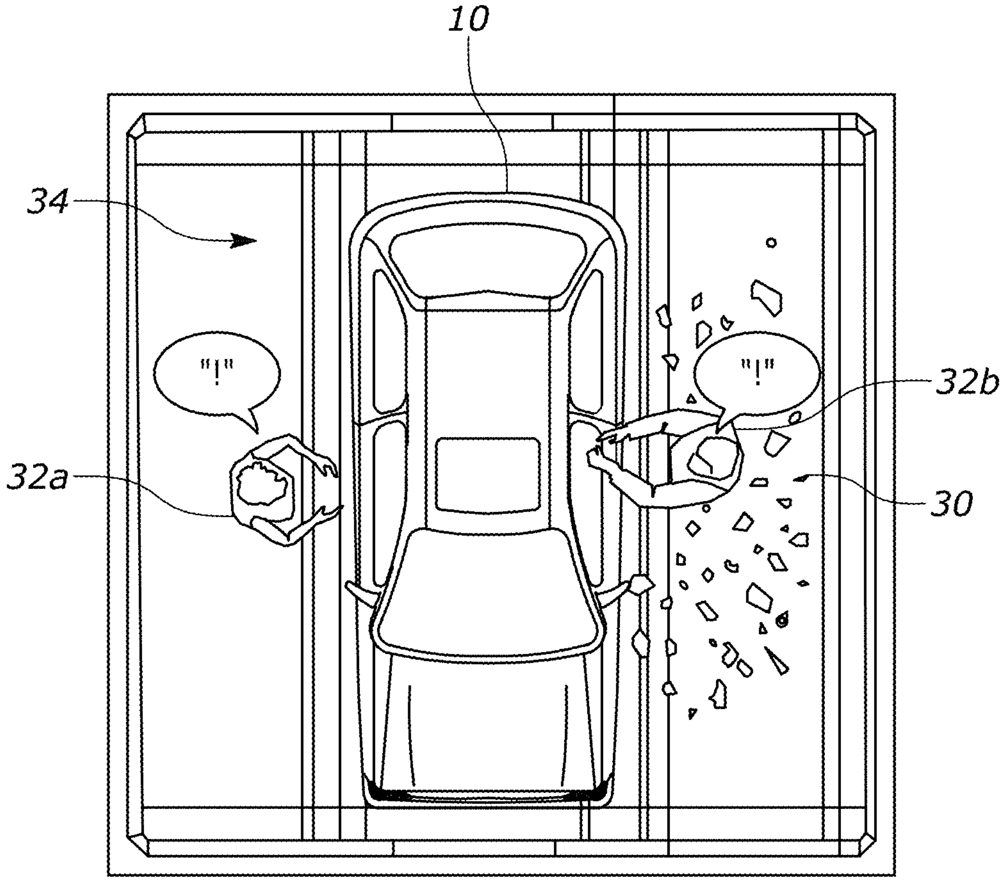
FIG. 2 illustrates an overhead schematic of a vehicle and the surroundings of the vehicle according to an embodiment, shown from a top view.

FIG. 2 shows an example of a scenario that might trigger the system to record images. Here, the vehicle 10 is located in a parking spot 34 and is parked. A first individual 32*a* is located on the left side of the vehicle 10, and a second individual 32*b* is located on the right side of the vehicle 10. Both individuals are arguing, as depicted by their respective word bubbles. This can be detected by on-board microphone(s) in the vehicle 10. Additionally, there is broken glass 30 shattered on the ground. The cameras on-board the vehicle can detect the presence of this broken glass. Additionally or alternatively, the microphone(s) can detect sound associated with glass breaking. Not only would this type of scenario trigger the cameras 16*a-d* to record the surroundings of the vehicle 10, but it would also trigger the ECU 14 to adjust the safety threshold based on the threatening scenario described herein. In embodiments, the safety threshold can be expressed by a specific number on a scale of 1 to 10, with 1 representing the least safe environment and 10 being the safest environment. The default safety threshold can be set by the vehicle OEM, or it can be adjusted by the user. For example, if the user wants the recording sensitivity to be higher (record more often), the user will set the safety threshold at a higher number. A high safety threshold requires that the detected safety score indicate a very safe environment to surpass this threshold. As a result, surpassing a higher threshold becomes more challenging, leading to fewer occurrences of exceeding it and hence fewer recordings of the environment. Conversely, setting a lower threshold means the threshold is easier to exceed, thereby causing the cameras to trigger less frequently and record less often. If the determined safety score exceeds the set safety threshold, the ECU will delay triggering the cameras 16*a-d* to record. This delay is directly correlated to the set safety threshold. For example, if the determined safety score exceeds a lower safety threshold, the delay will be shorter than if the safety threshold was exceeded at higher number because of the level of danger associated with a lower safety threshold. This ensures that vehicle power consumption is preserved while still maintaining the safety of the vehicle, regardless of the safety of the environment. The capabilities of this system is not limited to the example described herein. The cameras 16*a-d* and ECU 14 can be triggered by several other conditions, including but not limited to, time of day and presence of homeless people, as will be discussed further below.

In order for the system to identify contextual situations of a given scenario, it uses a context-aware machine learning model. This type of model advances machine learning by adapting its behavior or predictions based on the contextual information during inference or decision-making. For example, in smart home systems, a context-aware model utilizes inputs from sensors to adjust lighting levels based on if a person enters the room, time of day, or brightness. This type of model has the capability to analyze situations and does not operate on fixed inputs. In contrast, traditional machine learning approaches are often trained and tested on static datasets without considering the context in which they will be deployed. A context-aware machine model is utilized in the present disclosure to identify the potential threats around the vehicle. Specifically, the ECU 14 analyzes the images received from the cameras 16*a-d* using such models (e.g., object classification model, safety score prediction) to identify potential threats outside of the vehicle. As described above and in FIG. 2, this includes time of day, interaction between individuals, and scene understanding. Ultimately this model allows the system to identify all potential threats, ensuring the safety of the vehicle.

Figure 3:
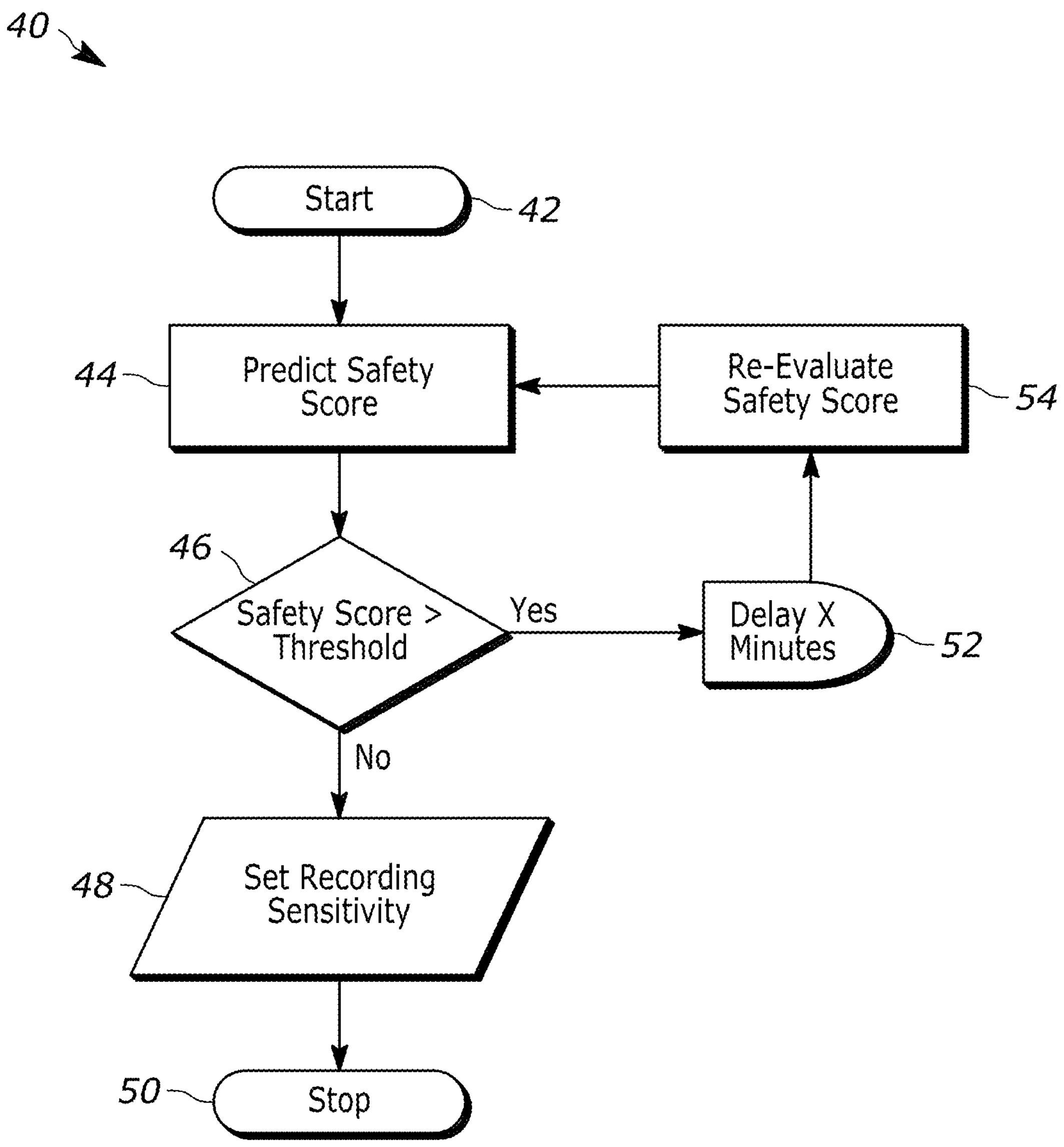
FIG. 3 is a flowchart of an example process of predicting and re-evaluating the safety score of an environment about a vehicle, in accordance with the present disclosure.

FIG. 3 is a flowchart of an example method 40 which predicts the safety of an environment about a vehicle, and re-evaluates the safety based on the determined safety threshold. In some implementations, one or more process blocks of FIG. 3 may be performed by the ECU 14. The method 40 can be executed by one or more processors disclosed herein, and instructions for executing the method can be stored in memory.

Figure 4:
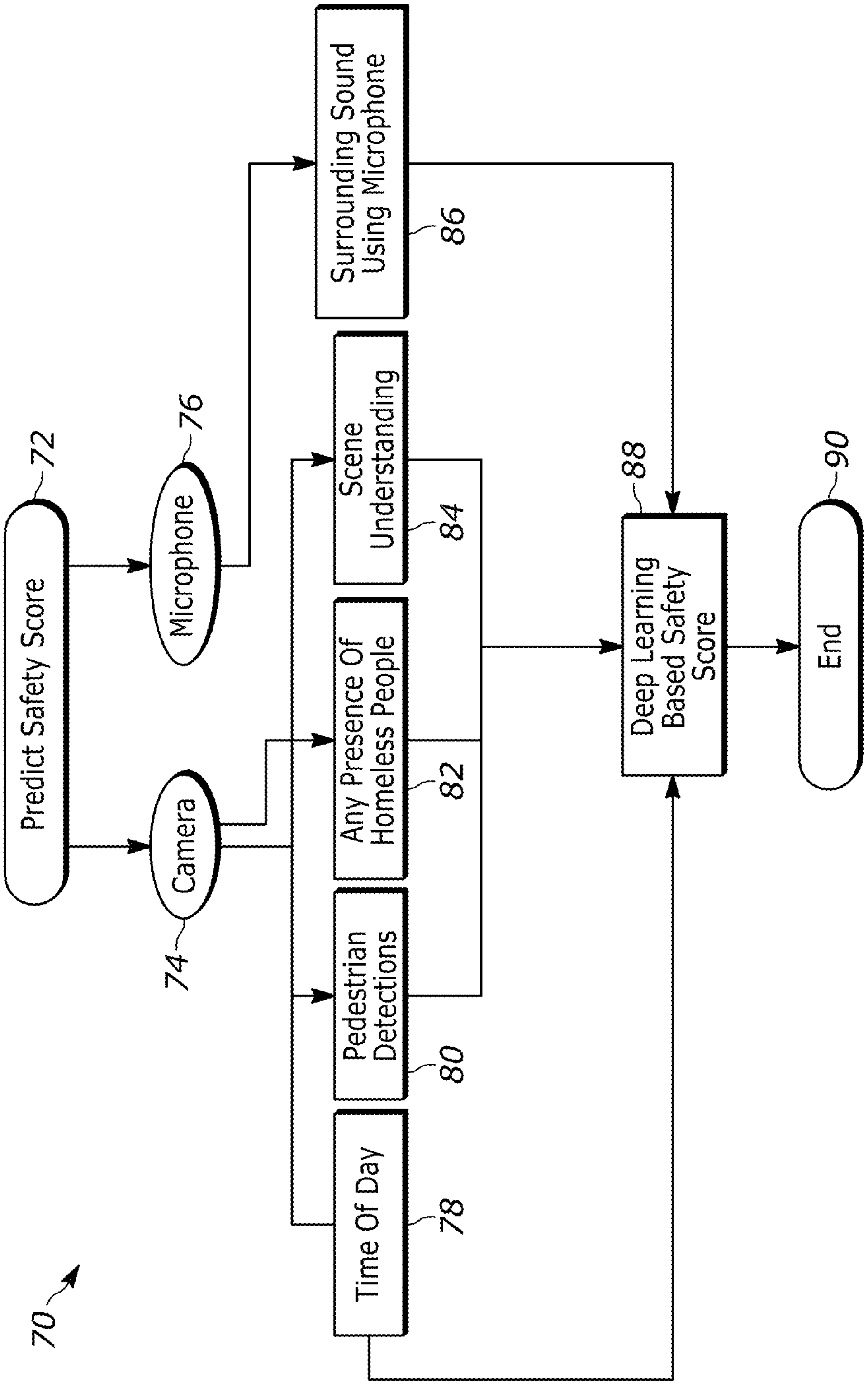
FIG. 4 is a flowchart of an example process for utilizing a machine learning model to predict the safety score of an environment about a vehicle, in accordance with the present disclosure.

As shown in FIG. 3, method 40 begins at 42. While the vehicle is driving, the system is initiated to predict a safety score of an environment at 44. Additional detail of predicting the safety score is shown in FIG. 4, described further below. Once this process is completed, the method continues to 46 where the safety score is compared to a threshold 46. If the safety score is above a threshold, the ECU 14 can delay the cameras from triggering in order to conserve vehicle power at 52. The delay is determined by the level of danger in the environment around the vehicle. The delay can be expressed in minutes and can vary depending on what level the safety threshold is set to. For example, if the safety threshold is exceeded while set to a low value (e.g., 2), an indication of a very dangerous area, the delay will be short so the vehicle actively monitors the environment. Alternatively, if the safety threshold is exceeded while set to a high value (e.g., 9), an indication of a very safe area, the delay will be long since the vehicle is not deemed to be in any immediate danger. In accordance with the specified delay, the ECU 14 will reevaluate 54 the safety score once the vehicle is parked. The method proceeds in this loop so long as the safety score exceeds the threshold. However, if the safety score is below a threshold, the ECU 14 can set the recording sensitivity 48 based on the severity of the threat detected in the environment. This will ultimately decipher how often the cameras 16*a-d* are triggered. Once the recording sensitivity is set 48, the method 40 will stop at 50 until the vehicle starts driving again.

As described above, the recording sensitivity is set when the determined safety score is below a specific threshold. At this point, the recording sensitivity will vary depending on the level of the safety score. For example, if the safety threshold is set at 4 and the safety score is determined to be 3, the cameras 16*a-d* will be triggered to record more often considering the dangerous nature of the area. This level of recording sensitivity will capture scenarios of the environment about the vehicle, such as arguments amongst individuals and types of individuals (e.g., homeless people), which may have otherwise gone unrecorded at a lower recording sensitivity. Because the vehicle would not have been actively monitoring the environment at a lower recording sensitivity, the user would not have been alerted that the vehicle is in danger.

FIG. 4 is a flowchart of an example method 70 for predicting the safety of an environment about a vehicle. A machine learning model, as further described below, may be relied upon to predict the safety score. This method 70 describes embodiments of how the safety score is predicted in step 44 of FIG. 3. Once the safety score is determined, the method shown in FIG. 4 70 ends at 90. In some implementations, one or more steps in FIG. 4 may be performed by the ECU 14.

As shown in FIG. 4, the predicted safety score 72 can be determined via the use of a camera 74 and a microphone 76. The camera 74 can be one or more of the cameras 16*a-d* described with reference to FIG. 1. The camera 74 captures images of the environment around the vehicle, including but not limited to: time of day 78, pedestrian detections 80, any presence of homeless people 82, and scene understanding 84. Once the images are captured by the camera, the system may use a type of deep machine learning model to analyze and process the images. The time of day 78 can be learned from the internal clock of the vehicle as well as through dissecting details of the images. Using the context-aware machine learning model, the system can identify objects captured by the camera 74, thereby allowing the system to assess the potential threat posed by these objects. The context-aware machine learning model described herein can also similarly analyze contextual scenarios about the vehicle.

As also shown in FIG. 4, a microphone 76 can be used to capture sounds of the environment 86, such as surrounding pedestrian encounters and the sound of broken glass. This can include the sound of glass thrown by an individual, or the sound of the vehicle 10 driving over the glass. Data obtained from the camera 74 and microphone 76 is further processed, via the utilization of deep machine learning 88, to determine the safety score of the environment.

In some embodiments, the deep learning-based safety score 88 may be determined via a neural network that may include, but is not limited to: a perceptron model, feed forward neural network, a convolution neural network, a radial basis functional neural network, a recurrent neural network, long short-term memory model, a sequence to sequence model, a modular neural network, an artificial neural network, a semantic segmentation model, or any appropriate neural network model. For example a convolutional neural network model can be used for object classification and recognition tasks. This model can be suitable for capturing features of objects through convolutional layers, making it effective for tasks like image classification, object localization, and semantic segmentation. Applied to the invention herein, a convolutional neural network model can identify features of objects around a vehicle and identify the level of threat each object contains. This information, coupled with the sound detected by the microphone 76, would then be used to generate a safety score of the surrounding environment. Used in correspondence with a semantic segmentation model, the system will be capable of classifying individual pixels in an image into predefined categories or classes, providing a detailed understanding of the spatial layout and context of objects within an image.

Given this, the model can be trained to characterize objects and determine the safety score based on the context associated with the detected objects (e.g., context-aware model). For example, assume the system detects an object in the area surrounding the vehicle, and that object is determined to be a person. The mere presence of a person may not increase the safety score significantly. However, if the model also determines that the person is running in a direction toward the vehicle, the safety score may increase. Further, if the microphone indicates the person is also yelling loudly, the safety score may further increase. Further, if the person is detected to be holding an object (e.g., a baseball bat, a knife), the safety score may further increase.

In some embodiments, the deep machine learning model may be trained using training data. The training data may include labeled inputs (e.g., crime-related information from a database, the presence of broken glass, the presence of a pedestrian, etc.) that are mapped to labeled outputs (e.g., the area in which the vehicle is ultimately parked, broken glass, pedestrian, etc.). Such training may be referred to as supervised learning. Additional types of training may be used, such as unsupervised learning where the training data is not labeled, and the machine learning models group clusters of the unlabeled training data based on patterns. The patterns may relate to certain characteristics being associated with certain probabilities of eligibilities than other probabilities. In addition, reinforcement learning may be used to train the one or more machine learning models, where a reward is associated with the models correctly determining a probability for one or more characteristics, such that the machine learning models reinforces (e.g., adjusts weights and/or parameters) selecting that probability for those characteristics. In some embodiments, some combination of supervised learning, unsupervised learning, and/or reinforcement learning may be used to train the one or more machine learning models.

Figure 5:
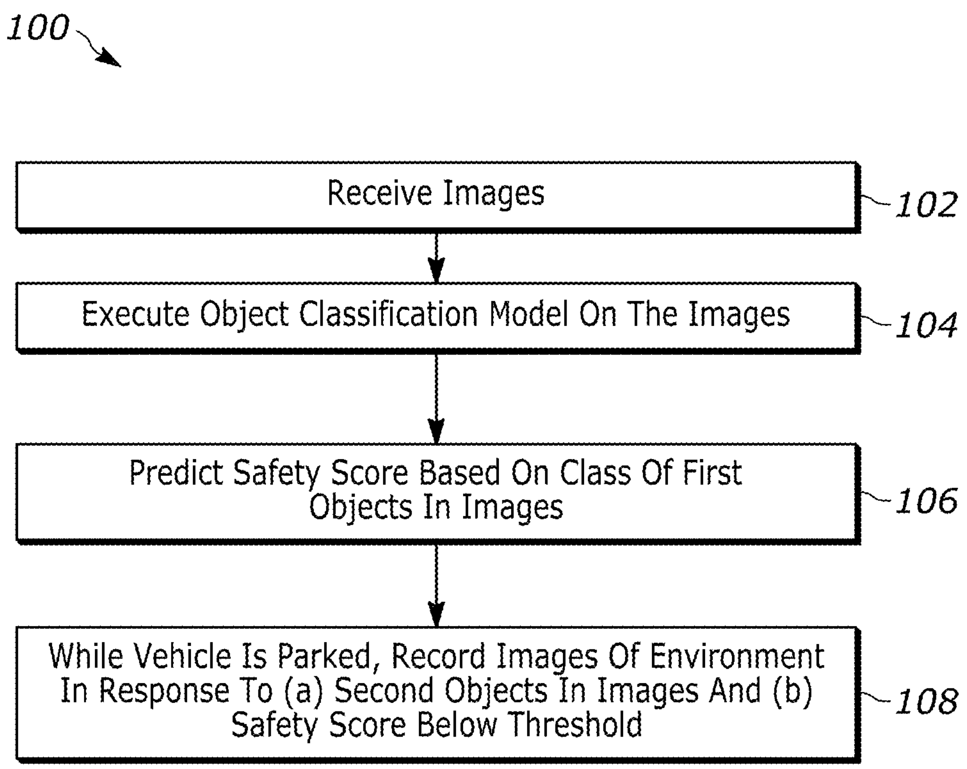
FIG. 5 illustrates an example of a flowchart of a method for predicting the safety of an environment about a vehicle, in accordance with the present disclosure.

FIG. 5 is a flowchart of an example method for predicting the safety of an environment about a vehicle and correspondingly controlling the vehicle's camera system's recording. In some implementations, one or more process blocks of FIG. 5 may be performed by the ECU 14.

As shown in FIG. 5, the method 100 includes receiving, via an image sensor associated with a vehicle, an image of an environment about a vehicle at 102. For example, the processor may receive sensor data from one or more image sensor (e.g., cameras 16*a-d* and/or proximity sensors 19) which may include but are not limited to image camera, video camera, ultrasonic sensors, radar, sonar, LiDAR, or any suitable sensor. In some embodiments, the data received from the image sensor may include video of the environment about the vehicle captured from multiple angles which may be stitched together to form a single image or video (e.g., a birds eye view, front view, side view, side mirror view, rear view, etc.). Receiving of images 102 from the one or more image sensors may be performed while the vehicle is driving.

As also shown in FIG. 5, the method 100 includes executing an object classification model on the images received from the one or more image sensors at 104. For example, the object classification model can analyze image data received from the image sensor. The object classification model described herein is trained and configured to, based on the image data, perform image classification (e.g., segmentation) to determine information about the detected object (e.g., multiple layers or granularities about the object). For example, the object classification model can be a machine learning model that determines not only the presence of an object, but also the type of object, its size, relative orientation, and the like. In an example of the detected object being a person, the type of person is also determined by the object classification model. This can include, for example, whether the person is a homeless person or a regular pedestrian. This granular detail can enable the vehicle and its ECU 14 to appropriately predict and update the safety score while ensuring power consumption is conserved.

The method 100 also includes predicting the safety score based on the class of first objects detected in the images at 106. Once the object classification model determines the class of first objects in the received images, the ECU 14 will be triggered to predict the safety score of the environment. This process can be entirely determined while the vehicle is driving, prior to the vehicle becoming parked. As described above, the safety score can be calculated on a scale (e.g., 1 to 10, with 1 representing the least safe environment and 10 being the safest environment). This calculation is determined by the detection of certain objects including but not limited to: pedestrians, threatening scenarios, sounds of broken glass, and time of day. Additionally and optionally, the safety score can be determined based on crime-related information from an online database. This database uses the GPS location of the vehicle to determine the safety of that area, and further factor this data into the overall safety score calculation. For example, a vehicle located in an area with a high crime rate would bring the safety score down. Alternatively, the safety score may increase if the vehicle leaves the dangerous area and enters a new, safer location as determined by the crime-related information associated with the GPS location of the vehicle. In embodiments, the location of the vehicle is determined based on the user's cellular device, which is connected to the vehicle. In this scenario, the safety score could be determined based on the safety of the user's intended location through GPS directions coupled with the information from the crime-related database. For example, the system can be configured to lookup the crime-related information associated with a location of a destination point determined by a turn-by-turn direction application utilized by the user's cellular device. Furthermore, the safety score may alter based on the time of day. For example, the safety score may go down as day turns to night.

The method 100 also includes triggering the cameras 16*a-d* to record images of the environment, while the vehicle is parked, in response to a second class of objects detected in the images and the safety score being below a threshold at 108. Once the vehicle is parked, the cameras 16*a-d* will be triggered to record the environment around the vehicle in correspondence with the set recording sensitivity and detection of a second class of objects in the images. Because the safety score is established as below the threshold, the cameras 16*a-d* will be triggered more often to record the environment. If objects are detected during that timeframe, an additional object classification model will be performed to identify a class of second objects. Depending on the type of objects detected in the environment, the ECU 14 will adjust the safety score accordingly, ensuring that the vehicle's power consumption is not unnecessarily used.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for assisting a vehicle in determining a safety of an environment about the vehicle, the system comprising:
- a plurality of image sensors mounted to the vehicle and configured to capture images of the environment about the vehicle; and
- a processor coupled to the plurality of image sensors and programmed to:
  - receive first images captured by the plurality of images sensors;
  - execute an object classification model on the first images to determine a class of one or more first objects detected in the first images while the vehicle is being driven and prior to the vehicle being parked;
  - predict a predicted safety score based on the determined class of the one or more first objects detected in the first images, wherein the predicted safety score is associated with the safety of the environment about the vehicle;
  - in response to the predicted safety score being above the threshold, delay controlling the plurality of image sensors to record images of the environment about the vehicle while the vehicle is parked for a delay determined based on the predicted safety score;
  - determine a set recording sensitivity for controlling the plurality of image sensors to record images of the environment about the vehicle while the vehicle is parked based on the predicted safety score;
  - receive second images of the environment about the vehicle while the vehicle is parked; and
  - control the plurality of image sensors to record the second images of the environment about the vehicle while the vehicle is parked according to the set recording sensitivity response to (a) one or more second objects being detected in the second images by the object classification model, and (b) the predicted score being below a threshold.

2. The system of claim 1, wherein the processor is further programmed to:
- while the vehicle is parked, (a) execute the object classification model to determine a class of the one or more second objects, and (b) adjust the predicted safety score based on the determined class of the one or more second objects.

3. The system of claim 2, wherein the processor is further programmed to:
- prevent recording of the second images in response to (a) the one or more second objects being detected in the second images and (b) the predicted safety score exceeding the threshold, wherein the processor is configured to delay recording based on the predicted safety score to conserve vehicle power, and wherein the delay is determined based on the level of danger associated with.

4. The system of claim 1, wherein the processor is further programmed to adjust the predicted safety score based further on a time of day.

5. The system of claim 1, wherein the processor is further programmed to:
- execute a context-aware machine learning model on the first images to determine a safety threat in the environment about the vehicle; and
- adjust the predicted safety score based on the safety threat.

6. The system of claim 1, wherein the processor is further programmed to:
- access a crime-related database containing crime-related information associated with a current location of the vehicle; and
- adjust the predicted safety score based on the crime-related information.

7. The system of claim 1, further comprising a microphone mounted to the vehicle and configured to detect a sound of broken glass;
- wherein the processor is further programmed to adjust the predicted safety score based on the detected sound of broken glass.

8. The system of claim 1, wherein the processor is further programmed to:
in response to the predicted safety score being reduced from a first predicted safety score during a first parked recording event to a second predicted safety score during a second parked recording event, increase the set recording sensitivity such that the plurality of image sensors are controlled to record the second images more frequently during the second parked recording event than during the first parked recording event.

9. A method for assisting a vehicle in determining a safety of an environment about the vehicle, the method comprising:
receiving first images of the environment about the vehicle captured by a plurality of image sensors mounted on the vehicle;
executing an object classification model on the first images to determine a class of one or more first objects detected in the first images while the vehicle is being driven and prior to the vehicle being parked;
predicting a predicted safety score based on the determined class of the one or more first objects detected in the first images, wherein the predicted safety score is associated with the safety of the environment about the vehicle;
in response to the predicted safety score being above the threshold, delay controlling the plurality of image sensors to record images of the environment about the vehicle while the vehicle is parked for a delay determined based on the predicted safety score;
determine a set recording sensitivity for controlling the plurality of image sensors to record images of the environment about the vehicle while the vehicle is parked based on the predicted safety score;
receive second images of the environment about the vehicle while the vehicle is parked; and
control the plurality of image sensors to record the second images of the environment about the vehicle while the vehicle is parked according to the set recording sensitivity response to (a) one or more second objects being detected in the second images by the object classification model, and (b) the predicted score being below a threshold.

10. The method of claim 9, further comprising:
while the vehicle is parked, (a) executing the object classification model to determine a class of the one or more second objects, and (b) adjusting the predicted safety score based on the determined class of the one or more second objects.

11. The method of claim 10 further comprising:
preventing recording of the second images in response to (a) the one or more second objects being detected in the second images and (b) the predicted safety score exceeding the threshold.

12. The method of claim 9, further comprising:
predicting the predicted safety score based further on a time of day.

13. The method of claim 9, further comprising:
executing a context-aware machine learning model on the first images to determine a safety threat in the environment about the vehicle; and
adjusting the predicted safety score based on the safety threat.

14. The method of claim 9 further comprising:
accessing a crime-related database containing crime-related information associated with a current location of the vehicle; and
adjusting the predicted safety score based on the crime-related information.

15. The method of claim 9, further comprising:
detecting a sound of broken glass captured by a microphone mounted to the vehicle; and
adjusting the predicted safety score based on the detected sound of broken glass.

16. The method of claim 9, further comprising:
in response to the predicted safety score being reduced from a first predicted safety score during a first parked recording event to a second predicted safety score during a second parked recording event, increase the set recording sensitivity such that the plurality of image sensors are controlled to record the second images more frequently during the second parked recording event than during the first parked recording event.

17. A non-transitory computer-readable storage medium storing instructions which, when executed by one or more processors, cause the one or more processors to perform:
receiving first images of the environment about the vehicle captured by a plurality of image sensors mounted on a vehicle;
executing an object classification model on the first images to determine a class of one or more first objects detected in the first images;
predicting a predicted safety score based on the class of the one or more first objects detected in the first images, wherein the predicting is performed while the vehicle is being driven and prior to the vehicle being parked, and wherein the predicted safety score is associated with the safety of an environment about the vehicle;
in response to the predicted safety score being above the threshold, delaying recording of images of the environment about the vehicle while the vehicle is parked for a delay determined based on the predicted safety score;
determine a set recording sensitivity for recording images of the environment about the vehicle while the vehicle is parked based on the predicted safety score; and
controlling the plurality of image sensors to record the second images of the environment about the vehicle while the vehicle is parked, wherein the controlling is performed according to the set recording sensitivity and in response to (a) one or more second objects being detected in the second images by the object classification model and (b) the predicted safety score being below a threshold.

18. The non-transitory computer-readable storage medium of claim 17, wherein the instructions further cause the one or more processors to perform:
while the vehicle is parked, (a) executing the object classification model to determine a class of the one or more second objects, and (b) adjusting the predicted safety score based on the determined class of the one or more second objects.

19. The non-transitory computer-readable storage medium of claim 18, wherein the instructions further cause the one or more processors to perform:
preventing recording of the second images in response to (a) the one or more second objects being detected in the second images and (b) the predicted safety score exceeding the threshold.

20. The non-transitory computer-readable storage medium of claim 17, wherein the instructions further cause the one or more processors to perform:
in response to the predicted safety score being reduced from a first predicted safety score during a first parked recording event to a second predicted safety score during a second parked recording event, increasing the set recording sensitivity such that the plurality of image sensors are controlled to record the second images more frequently during the second parked recording event than during the first parked recording event.

* * * * *